No. 661,376. Patented Nov. 6, 1900.
F. W. MARSHALL.
SPOKE SECURING NIPPLE.
(Application filed Apr. 18, 1900.)
(No Model.)
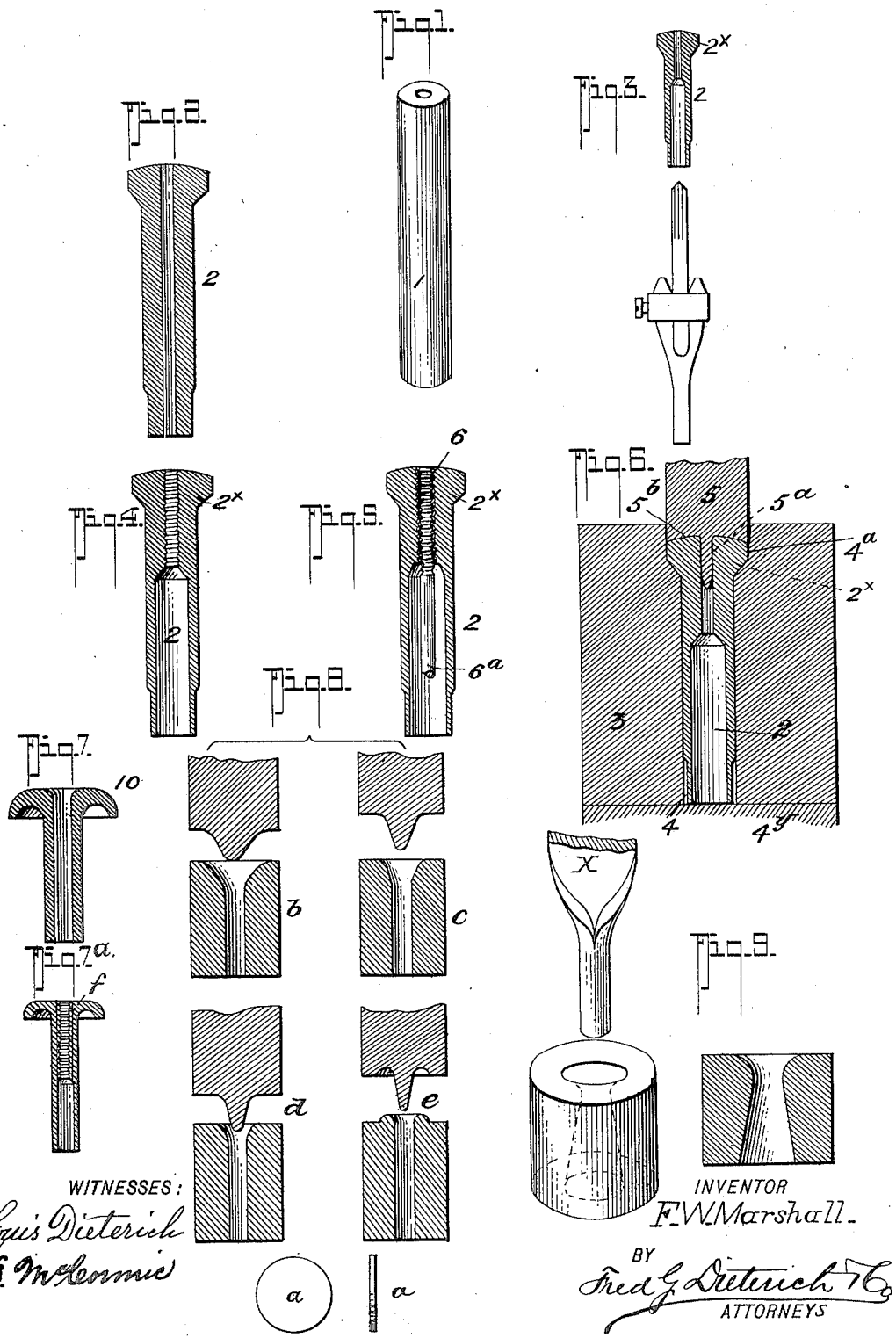
WITNESSES:
Louis Dieterich
E. McKenzie
INVENTOR
F. W. Marshall
BY
Fred G. Dieterich
ATTORNEYS

UNITED STATES PATENT OFFICE.

FREDRICK W. MARSHALL, OF WESTVILLE, CONNECTICUT.

SPOKE-SECURING NIPPLE.

SPECIFICATION forming part of Letters Patent No. 661,376, dated November 6, 1900.

Application filed April 18, 1900. Serial No. 13,342. (No model.)

*To all whom it may concern:*

Be it known that I, FREDRICK W. MARSHALL, residing at Westville, in the county of New Haven and State of Connecticut, have invented certain new and useful Improvements in Spoke-Securing Nipples, of which the following is a specification.

This invention has for its object to provide a new construction of nipple more especially intended as a substitute for the ordinary type of screw-socket nipples now in common use for securing the outer ends of the spokes of the bicycle-wheel to the rim.

In the manufacture of the common type of spoke-securing nipple the same is made up of a solid body or rod stuff, generally brass or other soft metal, with a finished external shape, and the said body after being externally formed is longitudinally drilled to produce the inner internal aperture, (which is afterward threaded,) one end of which is adapted to receive the threaded end of the spoke, the other end being adapted to receive the cap or screw that holds the nipple secure to the upper face of the rim.

In practical experience in the art of making nipples out of solid metal or rod stuff I have found such method of making them not all that is desired, for the reason that it requires, first, forming the nipple with its external contour; second, drilling it after thus formed to produce a central aperture, and, third, forming the internal threads in the said aperture after the same has been drilled. This method is not only a costly and tedious one, but is also not entirely reliable, for the reason that in drilling the aperture, especially in long nipples, the drill is frequently run into the nipple-block not true—that is, it enters the block in such a way as to leave the aperture at an angle to the longitudinal axis of the nipple-body, which causes the spoke end, as it is drawn up tight by the nipple, to bend at the nipple end and in consequence be thereby weakened and by reason thereof readily broken in the ordinary use of a bicycle-wheel.

My invention therefore in this case embodies a novel construction of nipple made up of sheet metal in the nature of tubing rolled or stamped out as a seamless tube and internally threaded to receive the spoke and rim engaging washer and nut.

In its more complete structure my improved nipple comprises a body formed of a section of hard-metal tubing having an integral washer or head portion for engaging with the rim and having an internal-threaded bushing of soft metal brazed, sweated, or otherwise made fast with the threaded end of the nipple, and in its subordinate features this invention consists in certain details of construction and novel combination of parts, all of which will be first described and then specifically pointed out in the appended claims, reference being had to the accompanying drawings, in which—

Figure 1 illustrates in section a piece of metal tubing which constitutes the body of my improved nipple. Fig. 2 is a view illustrating the said tubing formed with the head portion and the lower or non-circular portion. Fig. 3 is a similar view showing the tubing drilled smooth at the lower end, its upper portion remaining thickened to provide an annular surface in which the thread is to be formed. Fig. 4 illustrates in section the nipple with the thread cut out in the upper portion. Fig. 5 is a similar view showing the threaded end provided with a brass or similar rust-proof bushing. Fig. 6 is a view illustrating the manner in which the head portion of the nipple is formed. Figs. 7 and 7$^a$ illustrate a modified form of my nipple, the same in this case being provided with an integral head constructed to form a clamping member to engage with the upper surface of the rim. Fig. 8 illustrates a set of dies for forming my improved nipple when the same is of the shape shown in Fig. 7. Fig. 9 is a view illustrating the tube-drawing dies hereinafter referred to.

In the practical construction of my improved nipple, when the same is to have the shape shown in Figs. 2 and 5, it is formed of sheet metal, preferably steel sheeting, having a proper width for the circumference of the nipple-body and made of suitable length.

The blank-section from which the nipple is made and which is indicated by 1 in the drawings, is drawn through suitable dies, as illustrated at X in Fig. 9, to produce a continuous tubing, the edges or seam of which are closed in any well-known manner. After the blank is drawn to tubular or pipe shape the same is cut into lengths to suit the length of the nipple desired. After being thus cut into sections each tubular section 2 is fitted within a female die 3, having a central bore whose major portion 4 has a diameter to snugly receive the tubular section 2, and the upper part of the bore of the said die is enlarged and formed with an annular seat portion or head 4ª, as shown in Fig. 6, by reference to which it will be also seen that the said seat portion 4ª of the die 3 is of sufficient depth to allow for the proper upsetting of the upper end of the tubular section 2, which operation is effected by means of a punch or male die 5, having at its lower end a central projecting stud 5ª, adapted to fit down snugly into the upper end of the tubing, and the said lower or impacting surface of the die 3 is also provided with a concavity 5ᵇ, surrounding the stud 5, it being obvious that by forming the die 3 by any suitable pressing means against the upper end of the tube 2 a head portion 2ˣ will be formed upon the upper end of the said tube, as shown in Fig. 6, and to prevent the tubing 2 being forced down through the female die X is seated upon a solid metal base, as designated by 4ʸ in the drawings. After the tube 2 has been headed, as described, a supplemental tube 6, made of brass or other soft metal, is bent up, by drawing or other means, to a diameter that will snugly fit within the bore of the tubular section 2, the said soft-metal section 6 being sweated, brazed, or otherwise made secure within the upper end of the tubular section 2 and internally threaded, as shown. By thus forming a nipple it will be noticed that the body is left with a central bore of sufficient diameter to permit of a free insertion therein of the threaded end of the spoke 6, which is then adapted to engage with the internal-threaded end of the tubular section 2. The threaded bushing 6 may, however, be omitted and when it is the nipple or tubular section 2 is made out of stock heavy enough to allow for threads being cut directly thereinto in the upper end, as illustrated in Fig. 3 of the drawings. When this type of thimble is to be provided, the lower portion of the bore of the tubular section 2 is reamed out sufficient to let the spoke 6 slide freely thereon.

By referring now to Fig. 3 it will be noticed that the reamer acts as a center and will not allow the trimmer to do its work out of true, as is the case with nipples made from wire rod or solid stuff.

After the nipples have been formed in the manner shown and described they are trimmed, slotted, and slabbed the same as ordinary nipples.

Making the nipple out of steel tubing provides a spoke-securing means having greater strength than the ordinary form of brass nipple and also allows for making the nipple of lighter weight than a nipple of the same size formed of solid stock.

By making the nipple according to my method it can be produced as quickly as the ordinary brass nipple is produced, the gain in time in the manufacture being that it is not necessary to drill the center holes, as is required in making the solid-stock nipple. Furthermore, by using a brass bushing the cost of manufacturing the nipple is much reduced, for the reason that the brass pays for itself, as the threads can be cut out quicker therein than is possible in cutting into hard metal. Furthermore, in my construction of nipple I waste nothing in my construction of bushing except what chips from the top. It requires no drilling to produce my form of nipple, and in the employment of the bushing I use merely enough brass to form the threads. Furthermore, by forming the nipple of tubular metal the same may be case-hardened—a result not obtainable in the manufacture of nipples made of solid brass stuff. By making the same of hard metal the cost of manufacture will be about one-half of that of nipples formed of solid brass stock. Furthermore, by forming the nipple of a tubular body the bore or spoke-socket is bound to come true in the center, and thereby all danger of the said socket being at an angle to the longitudinal axis of the thimble is overcome and all danger of bending the spoke at the threaded ends avoided.

In Figs. 7 and 7ª I have shown a modified form of my invention. In this construction the nipple-body instead of being drawn in tubular form is stamped up out of a circular plate, (indicated by $a$,) which through successively engaging with the series of dies indicated by $b$, $c$, $d$, and $e$ in Fig. 8, assumes the shape of the nipple having an integral washer or rim-clamping head 10. In this form of nipple the bushing is also employed, as indicated at $f$ in Fig. 7ª. This latter form of nipple is entirely seamless.

From the foregoing description, taken in connection with the accompanying drawings, it is thought the advantages of my form of nipple will be readily appreciated by those skilled in the art to which it appertains.

Manifestly a nipple constructed in the manner described and shown will have the elements of cheapness of manufacture and great strength, and, furthermore, it facilitates the insertion of the spoke into the lower end of the nipple, and by reason of the said bore being almost in a true line with the longitudinal axis of the nipple the threaded end of the spoke will be made to engage the said nipple properly, and danger of the torsional or twist strain at the point where the said spoke contacts with the thimble by reason of the improper drilling of the aperture, as is frequently done in the manufacture of the solid-stock nipple, is entirely overcome.

It is obvious that the external contour of my improved nipple may be varied or modified to suit the particular character of connection it is desired to make with the rim and spoke.

Having thus described my invention, what I claim, and desire to secure by Letters Patent, is—

1. A nipple for the purposes stated, formed of hard sheet metal and bent up into tubular shape, the upper end terminating in an integral head, and a threaded sleeve of soft metal brazed or otherwise secured in the upper end of the bore of the tubular body, substantially as shown and described.

2. As a new article of manufacture, a nipple for bicycle-spokes, consisting of a hard-sheet-steel blank bent up into tubular shape, the upper end having an integral head or cap and a supplemental tubing of brass or other soft metal and fitted into the upper end of the tubular body said soft-metal tubing being threaded substantially as shown and for the purposes described.

FREDRICK W. MARSHALL.

Witnesses:
 SERENO D. DAVIS,
 CHARLES F. SCHOFIELD.